(12) United States Patent
Farcy et al.

(10) Patent No.: US 11,142,336 B2
(45) Date of Patent: Oct. 12, 2021

(54) AIRCRAFT UNDERCARRIAGE FITTED WITH A DEVICE FOR DETECTING BOTTOMING OF ITS SHOCK ABSORBER

(71) Applicant: SAFRAN LANDING SYSTEMS, Velizy-Villacoublay (FR)

(72) Inventors: Marc Farcy, Moissy-Cramayel (FR); Thibault Faure, Moissy-Cramayel (FR); Frédéric Renault, Moissy-Cramayel (FR)

(73) Assignee: SAFRAN LANDING SYSTEMS, Vélizy-Villacoublay (FR)

( * ) Notice: Subject to any disclaimer, the term of this patent is extended or adjusted under 35 U.S.C. 154(b) by 5 days.

(21) Appl. No.: 16/856,908

(22) Filed: Apr. 23, 2020

(65) Prior Publication Data
US 2020/0339277 A1 Oct. 29, 2020

(30) Foreign Application Priority Data
Apr. 25, 2019 (FR) ...................................... 1904390

(51) Int. Cl.
*B64D 45/00* (2006.01)
*B64C 25/50* (2006.01)
*B64C 25/60* (2006.01)

(52) U.S. Cl.
CPC .......... *B64D 45/0005* (2013.01); *B64C 25/50* (2013.01); *B64C 25/60* (2013.01)

(58) Field of Classification Search
CPC .......... B64D 45/0005; B64D 2045/008; B64D 45/00; B64C 25/50; B64C 25/60; B64C 25/58; B64C 25/001; B64F 5/60
See application file for complete search history.

(56) References Cited

U.S. PATENT DOCUMENTS

| | | | |
|---|---|---|---|
| 10,669,016 B2* | 6/2020 | Cusworth | ............... B64C 25/34 |
| 2008/0111386 A1* | 5/2008 | Boraas | ................. B65D 81/054 |
| | | | 293/117 |
| 2011/0214601 A1* | 9/2011 | Martin | .................... B64D 45/00 |
| | | | 116/203 |

FOREIGN PATENT DOCUMENTS

GB 2474686 A 4/2011

OTHER PUBLICATIONS

Rapport de Recherche Préliminaire, dated Jan. 14, 2020, issued in corresponding French Application No. 1904390, filed Apr. 25, 2019, 2 pages.

* cited by examiner

*Primary Examiner* — Valentina Xavier
(74) *Attorney, Agent, or Firm* — Christensen O'Connor Johnson Kindness PLLC

(57) ABSTRACT

An aircraft undercarriage comprising a shock absorber further comprising first and second portions that are mounted to slide telescopically relative to each other and that can come into internal abutment in the event of the shock absorber being compressed, the undercarriage being fitted with a detector device for detecting the shock absorber coming into internal abutment, which comprises firstly a punch secured to the first portion of the shock absorber or to a portion of the undercarriage that does not slide relative to the first portion of the shock absorber, and secondly a sacrificial piece secured to the second portion of the shock absorber or to a portion of the undercarriage that does not slide relative to the second portion of the shock absorber, the punch and the sacrificial piece being arranged in such a manner that, in the event of the two portions of the shock absorber coming into internal abutment, the punch strikes the sacrificial piece so as to form an indentation therein.

8 Claims, 5 Drawing Sheets

AIRCRAFT UNDERCARRIAGE FITTED WITH A DEVICE FOR DETECTING BOTTOMING OF ITS SHOCK ABSORBER

BACKGROUND

In general, an aircraft undercarriage includes a shock absorber comprising two elements that are associated to slide telescopically relative to each other. In direct undercarriages, one of the elements of the shock absorber forms the strut of the undercarriage that is secured to the structure of the aircraft, while the other element is a sliding rod that carries the wheels of the undercarriage. In lever undercarriages, the shock absorber is coupled firstly to a strut of the undercarriage that is secured to the structure of the aircraft, and secondly to a lever that is hinged to the strut and that carries the wheels of the undercarriage.

Under exceptional circumstances, it can happen that the aircraft is subjected to a hard landing, during which the shock absorber of the undercarriage is compressed to such an extent that the two elements of the shock absorber come into internal abutment (referred to as "bottoming"), giving rise to a risk of the component parts of the shock absorber being deformed. This event can also occur during a normal landing, when the shock absorber is not properly conditioned, or presents insufficient inflation pressure, or an insufficient volume of internal hydraulic fluid. It is appropriate to detect any bottoming in order to proceed with an inspection of the shock absorber to verify the state of its component parts.

Various devices are known for detecting bottoming. Such devices comprise an external indicator that is arranged, in the event of the undercarriage bottoming, to be moved from a position in which it does not indicate bottoming to a position in which it does indicate bottoming. By way of example, one such indicator is described in US Patent Publication 2011/0214601. That indicator moves from one position to the other as a result of a pin being broken in shearing by the shock absorber bottoming. Replacing that pin requires the entire indicator device to be taken apart.

Other detector devices are known that include sensors suitable for detecting the presence of a target coming into the immediate proximity of the sensor when the shock absorber bottoms. Nevertheless, such a device raises problems of reliability. It needs to be tested regularly, and it is always possible that it might fail, or on the contrary that might trigger a false alarm.

SUMMARY

An object of the disclosure is to provide an undercarriage fitted with a device for detecting bottoming of a shock absorber of the undercarriage, which device is very reliable and does not require any part to be broken.

In order to achieve this object or others, there is provided an aircraft undercarriage. In an embodiment, the aircraft undercarriage includes a shock absorber comprising first and second portions that are mounted to slide telescopically relative to each other and that can come into internal abutment in the event of the shock absorber being compressed, the undercarriage being fitted with a detector configured to detect the shock absorber coming into internal abutment. In an embodiment, the detector comprises firstly a punch secured to the first portion of the shock absorber or to a portion of the undercarriage that does not slide relative to the first portion of the shock absorber, and secondly a sacrificial piece secured to the second portion of the shock absorber or to a portion of the undercarriage that does not slide relative to the second portion of the shock absorber, the punch and the sacrificial piece being arranged in such a manner that, in the event of the two portions of the shock absorber coming into internal abutment, the punch strikes the sacrificial piece so as to form an indentation therein.

The indentation as formed in this way is very easy for maintenance personnel to notice during an inspection, and it cannot be obliterated or eliminated. The detector is very reliable, since there is no danger of it breaking down.

In an aspect of the disclosure, the punch is a pyramid-shaped point. It is then preferable for the pyramid-shaped point to be secured to a plate fitted to the undercarriage with interposed shims.

In another aspect of the disclosure, the sacrificial piece is a pellet. It is then preferable for the pellet to be carried by a tray formed integrally with the sliding rod of the undercarriage.

The disclosure applies to an undercarriage, for example, of the direct type in which the first portion of the shock absorber is formed by a strut of the undercarriage and the second portion of the shock absorber is formed by a sliding rod carrying at least one axle and mounted to slide telescopically in the strut, and wherein the punch is carried by the strut and the sacrificial piece is carried by the sliding rod.

The disclosure also applies to an undercarriage of the type having a rocker lever hinged to a strut, the shock absorber being coupled to the rocker lever and to the strut and comprising a cylinder in which a rod is mounted to slide telescopically, the punch and the sacrificial piece being secured, one to the cylinder and the other to the rod.

The disclosure also applies to an undercarriage of the steerable type comprising a steering tube mounted to turn relative to a strut of the undercarriage and connected by a scissors leakage to a rod carrying an axle and slidably mounted in the strut, the rod forming a cylinder of the shock absorber of the undercarriage, the punch and the sacrificial piece being secured, one to the rod and the other to the steering tube.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
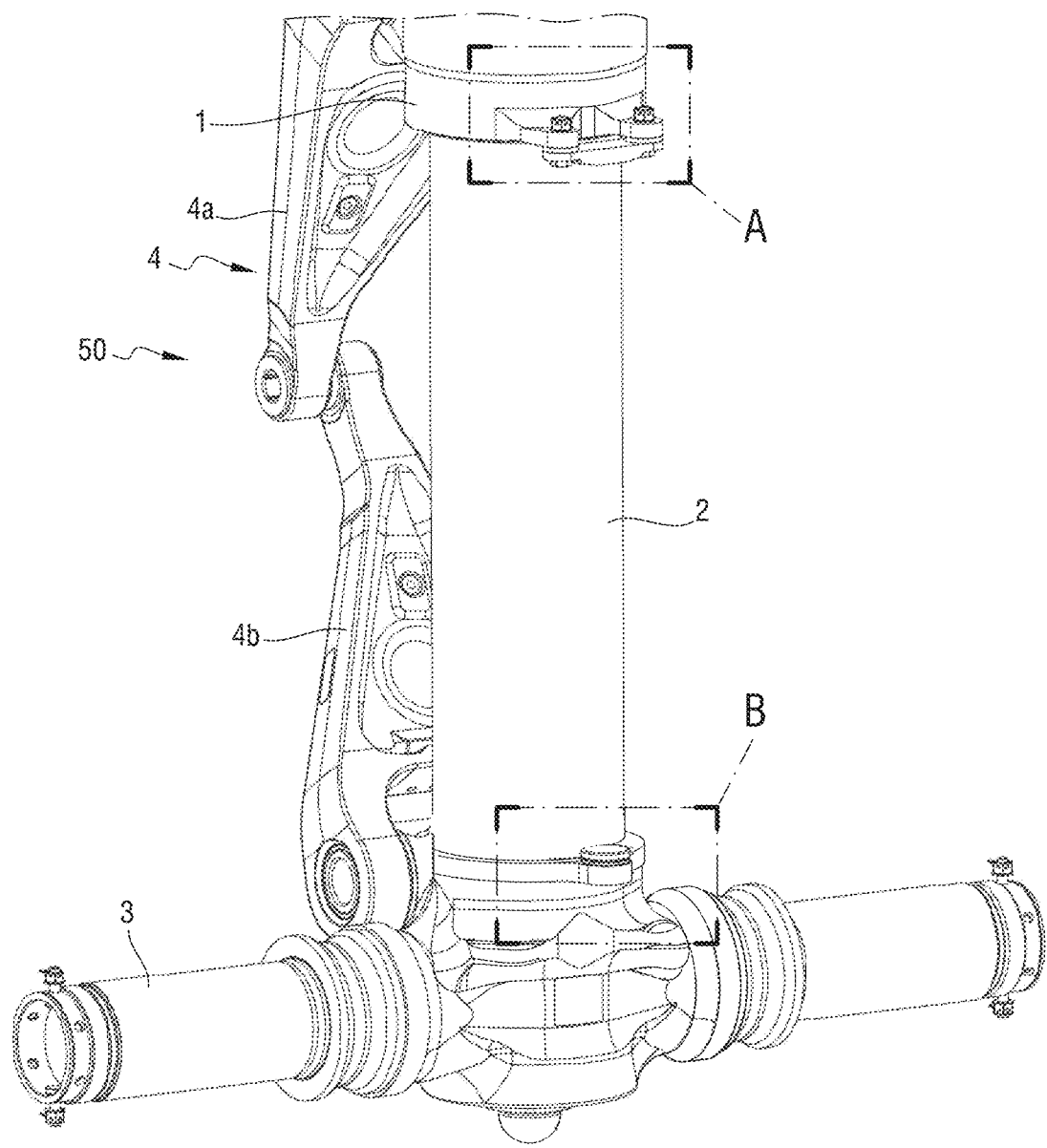
FIG. 1 is a perspective view of the bottom portion of an aircraft undercarriage with a direct shock absorber that is provided with an embodiment of a detector, the shock absorber being shown fully extended.

With reference to FIG. 1, in this example the disclosure is applied to an aircraft undercarriage 50 of the direct type that comprises a strut 1 secured to the structure of the aircraft, and a sliding rod 2 mounted to slide telescopically in the strut 1 and carrying at its end an axle 3 for receiving two wheels (not shown for reasons of clarity). The strut 1 and the rod 2 form the telescopic portions of a shock absorber, the strut 1 forming the cylinder of the shock absorber, while the sliding rod 2 forms the rod. A scissors linkage 4 comprising two branches 4a and 4b that are hinged to each other and that are hinged respectively to the strut 1 and to the sliding rod 2 about parallel hinge axes, serves to prevent any turning of the sliding rod 2 relative to the strut 1, while allowing them to slide relative to each other.

The internal structure of the shock absorber is well known, and is not described in detail herein. It suffices to recall that the sliding rod 2 is continuously urged towards its extended position as shown, and that, during a landing, the shock absorber becomes compressed against an internal shock absorbing force that comprises both an elastic component generated by compressing an internal volume of gas, and also a non-elastic component generated by throttling a hydraulic fluid.

During normal landings, the shock absorber is never compressed to such an extent that the sliding rod 2 comes into internal abutment (i.e., "bottoms") against the strut 1 when in the compressed position. Nevertheless, in certain exceptional circumstances, such an event can occur, e.g., during a particularly hard landing, or while landing at regulation speed and weight, but when the shock absorber is suffering from a conditioning defect (hydraulic fluid leakage, insufficient inflation pressure, . . . ). It is appropriate to be certain that any such event is detected, since it can result in damage to the internal portions of the shock absorber. An inspection must then be carried out in order to ensure that there is no such damage.

Figure 2:
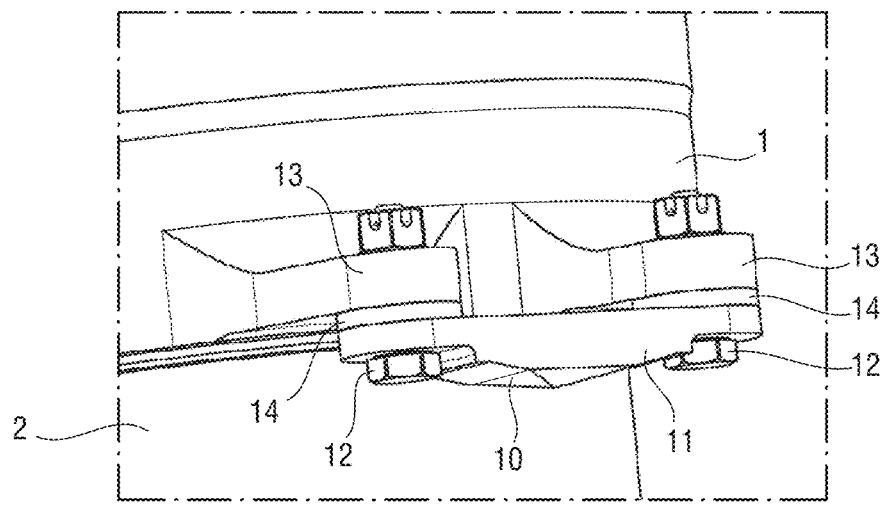
FIG. 2 is a view on a larger scale of a zone A of FIG. 1, showing the punch of the detector in accordance with an embodiment of the disclosure.
Figure 3:
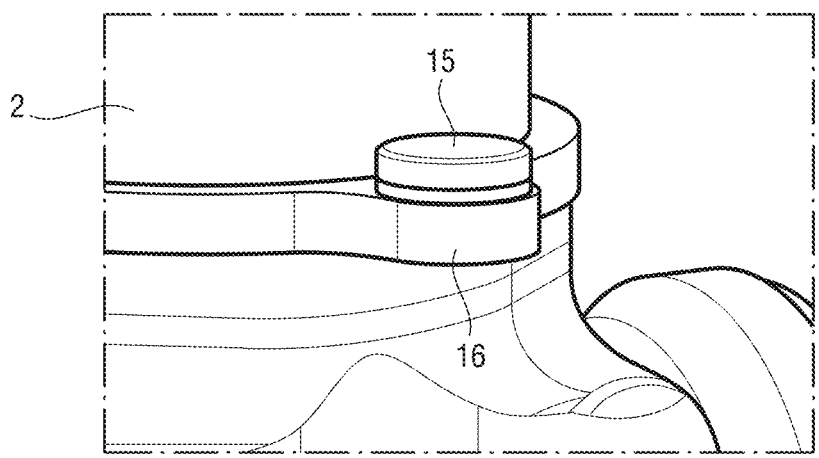
FIG. 3 is a view on a larger scale of a zone B of FIG. 1, showing the sacrificial piece of the detector in accordance with an embodiment of the disclosure.

For this purpose, and in accordance with an aspect of the disclosure, the undercarriage 50 is fitted with a device for detecting such events. As can be seen more particularly in FIGS. 2 and 3, the detector comprises firstly a punch, in this example in the form of a pyramid-shaped point 10 formed on the bottom face of a plate 11 that is fastened to the bottom portion of the strut 1 by two bolts 12 that secure the plate 11 to lugs 13 of the strut 1 with interposed shims 14 of adjustable thickness (e.g. peelable shims). Secondly, the detector comprises a sacrificial piece, in this example in the form of a pellet 15 carried on a tray 16 made integrally with the sliding rod 2. Naturally, the pyramid-shaped point 10 is made out of a material that is much harder than the material of the pellet 15, which, on the contrary, is made out of a material that is much softer and that is suitable for being marked easily.

Figure 4:
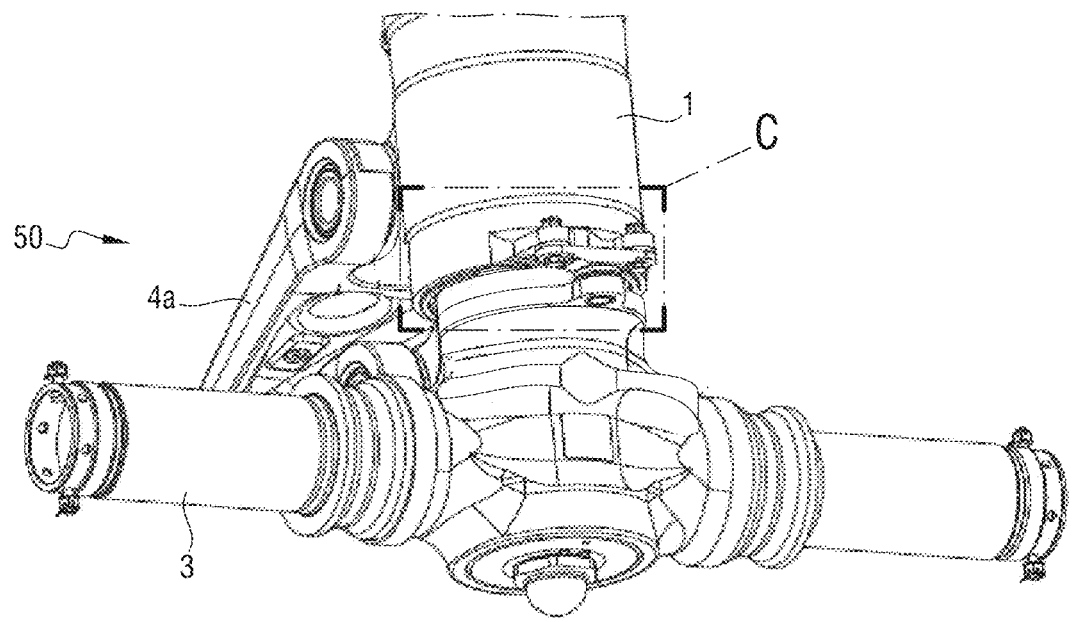
FIG. 4 is a view analogous to FIG. 1, the shock absorber being shown fully compressed and bottoming.
Figure 5:
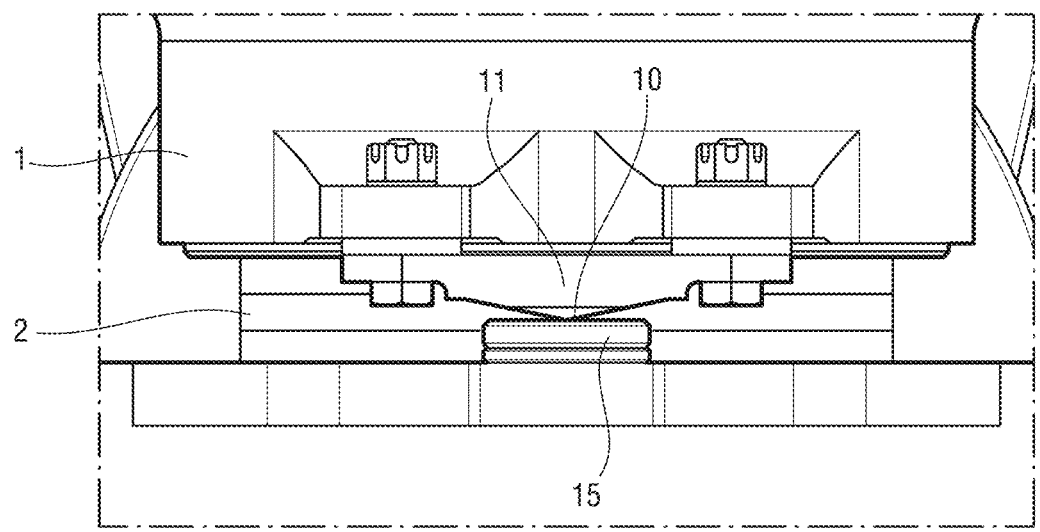
FIG. 5 is a view on a larger scale of a zone C of FIG. 4, showing the sacrificial piece being struck by the punch.

As can be seen in FIGS. 4 and 5, the pyramid-shaped point 10 and the pellet 15 are arranged relative to each other in such a manner that, when the shock absorber is fully compressed so that it bottoms, the pyramid-shaped point 10 strikes the pellet 15 and leaves a permanent pyramid-shaped indentation therein. As a result, the telescopic portions of the shock absorber coming into abutment in this way cannot pass unnoticed and is very easily detected during a visual inspection.

If an indentation is seen in the pellet 15 after a landing, that means that the two telescopic portions of the shock absorber have bottomed and that the shock absorber needs to be disassembled in order to inspect its internal parts. Once the inspection has been carried out, the pellet that has been marked should be replaced with a new pellet that does not have any indentation.

It should be observed that the extent to which the parts of the shock absorber have been subjected to internal deformation can be estimated by inspecting the indentation left by the pyramid-shaped point 10 in the pellet 15. Specifically, the indentation, which is square in shape in this example, has sides of length that depends on the depth to which the pyramid-shaped point 10 has penetrated, and thus on the internal deformation of the parts of the shock absorber. For example, in a particular embodiment, an indentation in the shape of a square with a side of 0.94 millimeters (mm) is representative of the internal parts being deformed by 0.1 mm. The size of the square forming the indentation thus gives an indication about the severity of the bottoming. In some embodiments, the maintenance operator has a computer program or a chart associating square sizes with expected internal deformation and/or with maintenance operations that need to be carried out.

The peelable shims 14 enable the position of the pyramid-shaped point 10 to be adjusted finely so that the indentation left in the sacrificial piece is large enough to be detectable at a glance.

Figure 6:
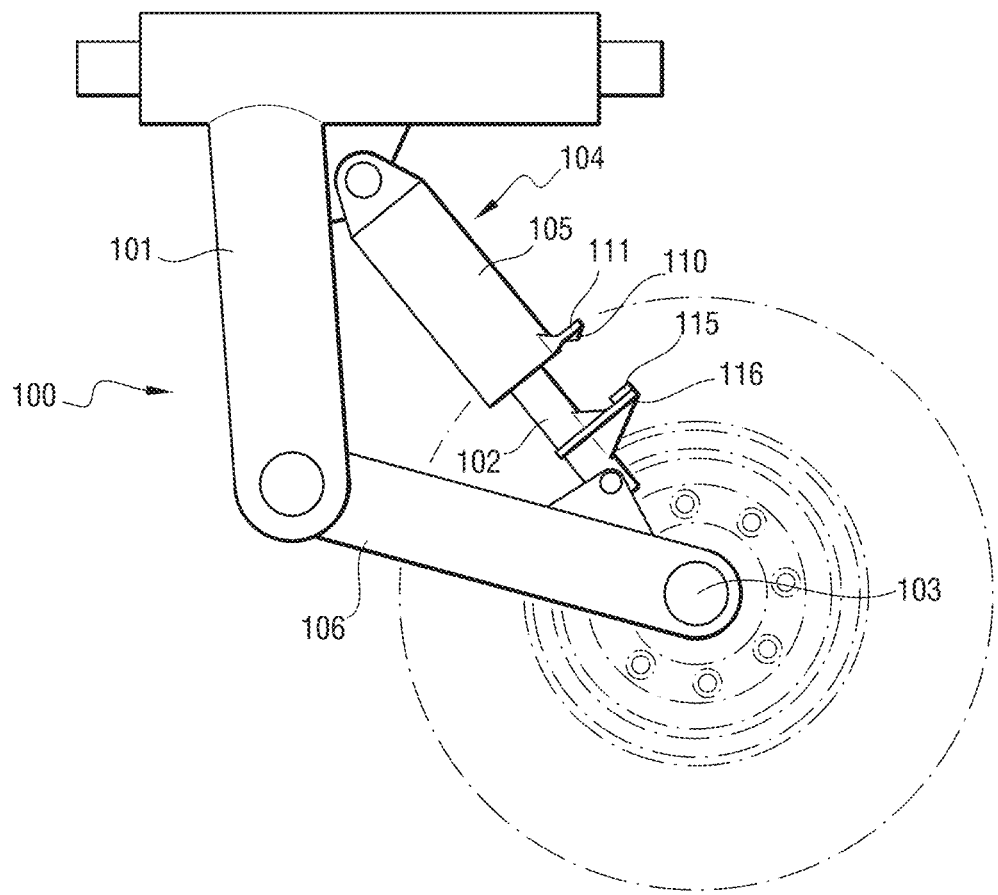
FIG. 6 is a perspective view of an aircraft undercarriage with a rocker lever that is fitted with a detector.

Of course, the disclosure applies to undercarriages of other types. In FIG. 6, there can be seen, by way of example, an undercarriage 100 in which the strut 101 is hinged to a rocker lever 106 carrying an axle 103. A separate shock absorber 104 is coupled firstly to the strut 101 and secondly to the rocker lever 106. The shock absorber 104 comprises a cylinder 105 having a rod 102 that is telescopically slidable therein. In accordance with the disclosure, the cylinder 105 is fitted with a punch 110 carried by a support 111 that is secured to the cylinder 105, and the rod 102 is fitted with a sacrificial piece 115 carried by a support 116 that is secured to the rod 102. The punch 110 and the sacrificial piece 115 are arranged in such a manner as to strike each other if the shock absorber 104 bottoms during a landing.

Figure 7:
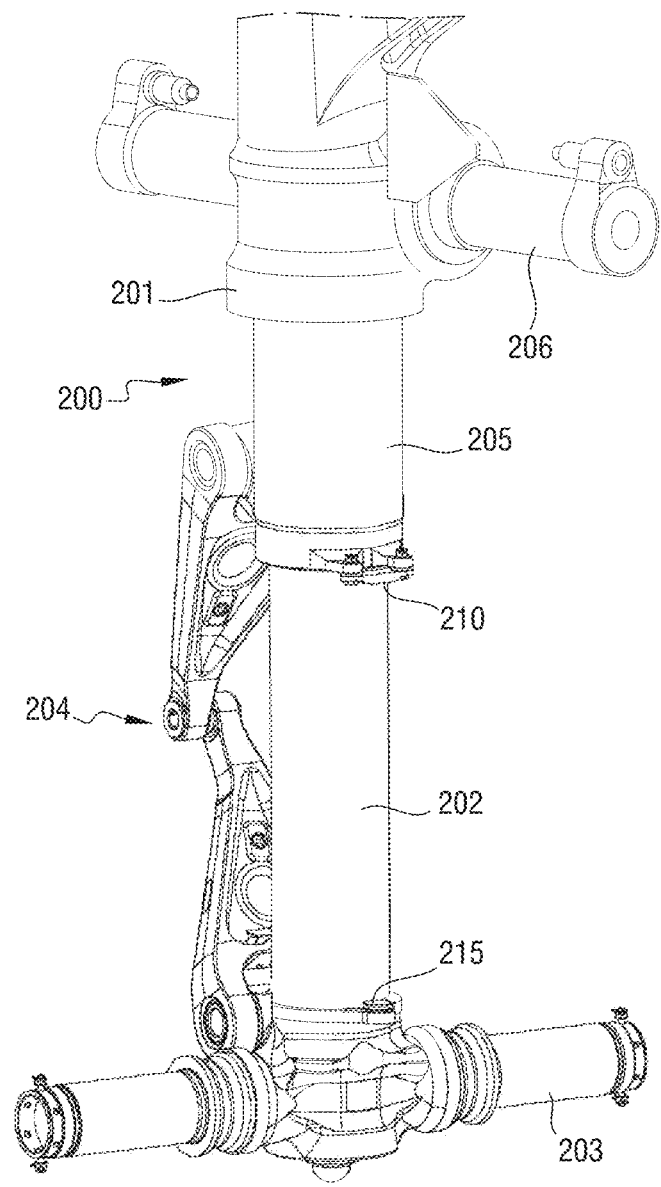
FIG. 7 is a perspective view of an aircraft undercarriage with steerable wheels that is fitted with a detector.

Naturally, the simplest arrangement consists in securing the punch and the sacrificial piece to respective ones of the telescopic elements of the shock absorber of the undercarriage, as shown above. Nevertheless, that is not always possible. In FIG. 7, there can be seen a nose undercarriage in which the rod is steerable in order to steer the wheels and thus allow the aircraft to turn on the ground. More precisely, the undercarriage 200 comprises a strut 201 having a steering tube 205 mounted at its bottom end so as to turn under the action of a steering actuator 206. The rod 202, which carries the axle 203, is mounted to slide inside the steering tube 205 and is constrained to turn with the steering tube 205 by the scissors linkage 204. In this example, the slidable rod 202 forms the first telescopic element of a shock absorber (specifically its cylinder), while the second telescopic element of the shock absorber is a rod that is not visible in FIG. 7 but that extends inside the strut 201 so as to be fastened to its top end. This rod is not accessible from the outside. To get around this difficulty, the sliding rod 202 is fitted with a sacrificial piece in the form of a pellet 215, as above, but the punch, specifically a pyramid-shaped point 210, is now carried by the steering tube 205, i.e., by an element of the undercarriage that does not slide relative to the second telescopic element of the shock absorber. Thus, in the event of the shock absorber bottoming, the pyramid-shaped point 210 strikes the pellet 215 as above so as to leave an indentation therein.

The disclosure is not limited to the above description, but on the contrary covers any variant coming within the ambit defined by the claims. In particular, although it is stated that the bunch is in the form of a pyramid-shaped point, any other shape could be used (e.g., a conical point, a ball, etc. providing it is suitable for leaving an indentation in the sacrificial piece. Although it is stated that the punch is associated with position-adjustment elements in the form of peelable shims, other adjustment means could be used, e.g., such as a vernier, or indeed the adjustment means could be associated not with the punch, but with the sacrificial piece.

Although it is preferable, whenever possible, to secure the punch to one of the telescopically slidable portions of the shock absorber and to secure the sacrificial piece to the other one of the portions, it is also possible, more generally, to associate the punch and/or the sacrificial piece with a portion of the undercarriage that does not slide relative to the corresponding portion of the shock absorber, e.g. such as the steering tube in FIG. 7, or indeed with a support that is secured to the rocker lever of FIG. 6, providing that the punch strikes the sacrificial piece so as to leave an indentation therein whenever the shock absorber bottoms.

The punch and the sacrificial piece may be made out of any materials providing the punch can penetrate into the sacrificial piece in the event of bottoming.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An aircraft undercarriage comprising
a shock absorber comprising first and second portions that are mounted to slide telescopically relative to each other and that can come into internal abutment in the event of the shock absorber being compressed, the undercarriage being fitted with a detector fitted to the undercarriage, the detector configured to detect the shock absorber coming into internal abutment, said detector comprising firstly a punch secured to the first portion of the shock absorber or to a portion of the undercarriage that does not slide relative to the first portion of the shock absorber, and secondly a sacrificial piece secured to the second portion of the shock absorber or to a portion of the undercarriage that does not slide relative to the second portion of the shock absorber, the punch and the sacrificial piece being arranged in such a manner that, in the event of the two portions of the shock absorber coming into internal abutment, the punch strikes the sacrificial piece so as to form an indentation therein.

2. The aircraft undercarriage according to claim 1, wherein the punch is a pyramid-shaped point.

3. The aircraft undercarriage according to claim 2, wherein the pyramid-shaped point is secured to a plate fitted to the undercarriage with interposed peelable shims.

4. The aircraft undercarriage according to claim 1, wherein the sacrificial piece is a pellet.

5. The aircraft undercarriage according to claim 4, wherein the pellet is carried by a tray formed integrally with the sliding rod of the undercarriage.

6. The aircraft undercarriage according to claim 1, wherein the undercarriage is of the direct type in which the first portion of the shock absorber is formed by a strut of the undercarriage and the second portion of the shock absorber is formed by a sliding rod carrying at least one axle and mounted to slide telescopically in the strut, and wherein the punch is carried by the strut and the sacrificial piece is carried by the sliding rod.

7. The aircraft undercarriage according to claim 1, wherein the undercarriage is of the type having a rocker lever hinged to a strut, the shock absorber being coupled to the rocker lever and to the strut and comprising a cylinder in which a rod is mounted to slide telescopically, the punch and the sacrificial piece being secured, one to the cylinder and the other to the rod.

8. The aircraft undercarriage according to claim 1, wherein the undercarriage is of the steerable type comprising a steering tube mounted to turn relative to a strut of the undercarriage and connected by a scissors leakage to a rod carrying an axle and slidably mounted in the strut, the rod forming a cylinder of the shock absorber of the undercarriage, the punch and the sacrificial piece being secured, one to the rod and the other to the steering tube.

* * * * *